United States Patent [19]

Martin et al.

[11] 3,883,850

[45] May 13, 1975

[54] PROGRAMMABLE WORD RECOGNITION APPARATUS

[75] Inventors: Thomas B. Martin, Burlington; Marvin B. Herscher, Camden, both of N.J.

[73] Assignee: Threshold Technology, Inc., Cinnaminson, N.J.

[22] Filed: June 19, 1972

[21] Appl. No.: 264,232

[52] U.S. Cl. .............................. 340/172.5; 179/1 SA

[51] Int. Cl. ........ G06f 7/04; G06f 15/34; G10l 1/02

[58] Field of Search ...... 340/172.5; 179/1 SA, 1 SB; 324/77 B, 77 E

[56] References Cited

UNITED STATES PATENTS

| | | | |
|---|---|---|---|
| 3,211,832 | 10/1965 | Putzrath | 179/1 SA |
| 3,416,080 | 12/1968 | Wright et al. | 324/77 |
| 3,466,394 | 9/1969 | French | 179/1 SB |
| 3,509,280 | 4/1970 | Jones | 179/1 SB |
| 3,619,509 | 11/1971 | Barger et al. | 179/15 A |
| 3,673,331 | 6/1972 | Hair et al. | 179/1 SB |
| 3,679,830 | 7/1972 | Uffelman et al. | 179/1 SA |
| 3,681,756 | 8/1972 | Burkhard et al. | 340/172.5 |
| 3,697,703 | 10/1972 | Clark et al. | 179/1 SA |
| 3,700,815 | 10/1972 | Doddington et al. | 179/1 SA |
| 3,755,627 | 8/1973 | Berkowitz et al. | 179/1 SA |
| 3,770,892 | 11/1973 | Clapper | 179/1 SA |

*Primary Examiner*—Raulfe B. Zache
*Assistant Examiner*—Jan E. Rhoads
*Attorney, Agent, or Firm*—Martin Novack, Esq.

[57] ABSTRACT

An apparatus which receives coded input data representative of speech feature sequences associated with selected words as spoken by an individual. The coded data is typically formulated beforehand from speech samples of the individual and is entered when the individual is to operate the apparatus. The apparatus is "programmed" by the coded input data to recognize the selected words when they are subsequently spoken by the individual. In accordance with the invention there is provided a feature extraction means for processing received spoken words and generating feature output signals on particular ones of a number of feature output lines. At least one sequential logic chain is provided, the chain including a plurality of logic units having logic input lines. The logic units are sequentially activated by the presence of signals on the logic input lines. Programmable means are provided for effectively coupling selected ones of the feature output lines to the logic input lines, the coupling selections depending on the coded input data. In a preferred embodiment of the invention the programmable means includes means for periodically sampling selected output signals and applying the sampled signals to the logic input lines, the feature output signal sampled at a given time being determined by the coded input data. In this embodiment, the sampled signals are applied to the logic input lines in a predetermined sequence, the predetermined sequence being repeated continuously.

11 Claims, 8 Drawing Figures

PROGRAMMABLE WORD RECOGNITION APPARATUS

BACKGROUND OF THE INVENTION

This invention relates to speech recognition apparatus and, more particularly, to an apparatus that is programmable to recognize predetermined words as spoken by particular individuals. The invention herein described was made in the course of or under a contract or subcontract thereunder, with the Air Force.

There have been previously developed various equipments that recognize limited vocabularies of spoken words by sequential analysis of acoustic events. Typically, such equipments are utilized in "voice command" applications wherein, upon recognizing particular words, the equipment produces electrical signals which control the operation of a companion system. For example, a voice command may be used to control a conveyor belt to move in a specified manner or may control a computer to perform specified calculations.

For maximum effectivity, a speech recognition equipment should be adaptable for use by a number of different people. One of the problems in perfecting speech recognition equipments is the diversity of ways in which different individuals say the same word. Every human has a unique set of speech-forming organs that yield subtle differences of sound when compared to another human speaking the same word. Individual differences in pronunciation further add to the number of possible acoustic sequences that can result when a particular word is spoken. To deal with this phenomenon, equipments have been designed to recognize any of a large number of acoustic sequences as representing a particular word. The problem with this approach is an inherent lack of recognition accuracy. If the equipment is necessarily non-restrictive in its recognition criteria, it follows that the criteria will be more easily satisfied by extraneous words and recognition accuracy will suffer.

To improve recognition accuracy, it would be desirable to change the recognition criteria for different speakers. For example, when a particular speaker is using the equipment, only his more restrictive recognition criteria (determined, say, beforehand by experimentation) would be operative. For such a scheme to be practical, however, certain requirements should be met: The equipment should be easily reprogrammable for different users and/or vocabularies. Also, the equipment should not be unduly complex since large numbers of components and connections would render it expensive and unreliable. It is one object of this invention to provide an equipment which meets these requirements.

SUMMARY OF THE INVENTION

The present invention is directed to an apparatus which receives coded input data representative of speech sequences associated with selected words as spoken by an individual. The coded data is typically formulated beforehand from speech samples of the individual and is entered when the individual is to operate the apparatus. The apparatus is programmed by the coded input data to recognize the selected words when they are subsequently spoken by the individual.

In accordance with the invention there is provided a feature extraction means for processing received spoken words and generating feature output signals on particular ones of a number of feature output lines. At least one sequential logic chain is provided, the chain including a plurality of logic units having logic input lines. The logic units are sequentially activated by the presence of signals on the logic input lines. Programmable means are provided for effectively coupling selected ones of the feature output lines to the logic input lines, the coupling selections depending on the coded input data.

In a preferred embodiment of the invention, the programmable means includes means for periodically sampling selected feature output signals and applying the sampled signals to the logic input lines, the feature output signal sampled at a given time being determined by the coded input data. In this embodiment, the sampled signals are applied to the logic input lines in a predetermined sequence, the predetermined sequence being repeated continuously.

Further features and advantages of the invention will become more readily apparent from the following detailed description when taken in conjunction with the accompanying drawings.

DESCRIPTION OF THE PREFERRED EMBODIMENT

Figure 1:
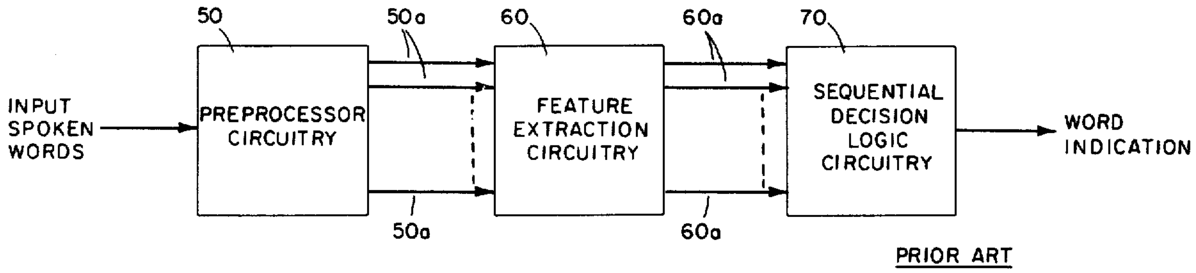
FIG. 1 is a simplified block diagram of a prior art speech recognition apparatus.

Referring to FIG. 1, there is shown a simplified block diagram of a prior art apparatus for recognizing spoken words by sequential analysis of acoustic events. Input spoken words are received by preprocessor circuitry 50 which utilizes a bank of bandpass filters to translate speech into a plurality of spectral component signals on lines 50*a*. (As referred to herein, the terms "input spoken words," "spoken words" and the like are intended to generically include any acoustical or electrical representation of communicative sounds. Typically, the circuitry 50 is adapted to receive word communications directly from an individual, or word-representative electrical signals from over a telephone line or tape recorder.) The processed spectral component signals on lines 50*a* are received by feature extraction circuitry 60*a* which generates feature output signals on particular ones of a number of feature output lines 60*a*. Signals on these feature lines may represent, for example, the presence of commonly used vowel and consonant sounds.

The feature output signals on lines 60a are received by sequential decision logic circuitry 70 which includes one or more sequential logic chains. Each logic chain is associated with a word that is to be recognized by the apparatus. The number of active logic stages in a particular gate is related to the number of sequential phonetic events that form the word. As a simplified example, the word "go" can be thought of as consisting of the phoneme /g/ followed by the phoneme /o/, i.e. /g/ → /o/. The logic chain for this word would thus require two stages, the first stage being coupled to the feature output line that indicates the presence of a /g/ and the second stage being coupled to the feature output line that indicates the presence of an /o/. When a /g/ and an /o/ occur in sequence, the stages are sequentially activated and an output of the second (last) stage of this logic chain would be an indication that the spoken word go had been received at the apparatus input. Similarly, the word "book" would require three sequentially activated stages for the sequence of phonemes /b/ → /U/ → /k/.

FIG. 2 illustrates, in some further detail, portions of the prior art apparatus of FIG. 1. A full description of both the proprocessor circuitry 50 and the feature extraction circuitry 60 can be found in a publication entitled "Acoustic Recognition of A Limited Vocabulary of Continuous Speech" by T. B. Martin and published by University Microfilms, Ann Arbor, Mich. It should be emphasized, however, that the present invention deals largely with already-processed feature signals and any suitable means for obtaining the feature signals can be employed. Accordingly, the extent of detail set forth herein is limited to that needed to facilitate understanding of the portions of the apparatus thought inventive.

Figure 2A:
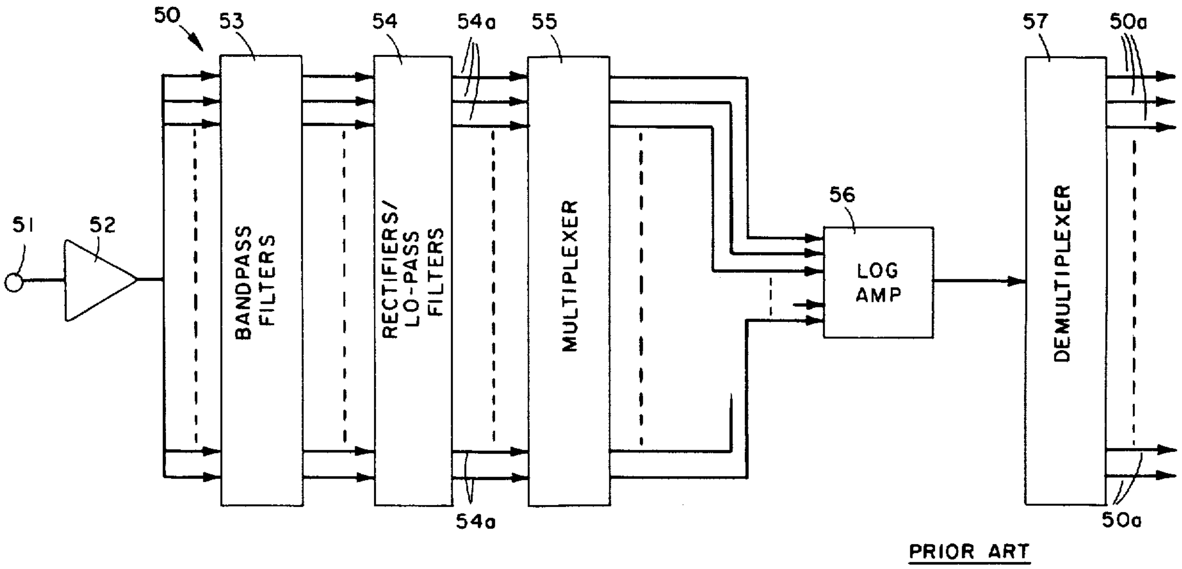
FIG. 2A is a block diagram of prior art preprocessor circuitry.

FIG. 2A is a block diagram of the preprocessor circuitry 50. A transducer 51, typically a gradient microphone, receives input spoken words and produces time-varying electrical signals that are representative of the received sounds. The output of transducer 51 is coupled, via preamplifier 52, to 19 contiguous bandpass filters in a filter bank 53. Each filter in the bank produces an output signal related to that portion of the input signal which lies in the range of frequencies passed by the particular filter. Typically, the filter center frequencies range from about 250 to about 7,500 Hz. with the lowest filter bandwidth being about 150 Hz.

The output of each filter in the bank 53 is individually coupled to a full wave rectifier and lowpass filter combination located in a rectifier/low-pass filter bank 54. After rectification and filtering, the outputs of the bank 54 essentially represent the energy levels of the input signal at about the center frequencies of each of the bandpass filters in the bank 53. Viewed in another way, the signals on lines **54*a*** collectively represent the envelope of the energy vs. frequency spectrum of the received input signal taken over the frequency range of interest.

The 19 channels of information on lines **54*a* are logarithmically compressed to produce the spectral component outputs on lines 50*a* of the preprocessor. Logarithmic compression facilitates subsequent processing in two ways. First, it provides dynamic range compression that simplifies the engineering design requirements of feature extraction circuitry 60.** Secondly, by virtue of using logarithms, comparative ratios of the spectral component signals can be readily computed by subtraction. Ratios are desirable processing vehicles in that they are independent of changes in overall signal amplitudes. This property is particularly advantageous in a system where input speech of varying loudness is to be recognized.

In the diagram of FIG. 2A, a signal log amplifier 56 is time shared to avoid the necessity of using nineteen identical amplifiers to achieve compression. The outputs on lines **54*a* are effectively sampled by a multiplexer 55 and the sampled signals passed, one at a time, through the shared amplifier 56. A demultiplexer 57 then "reconstructs" compressed spectral component signals on lines 50*a*** from the processed sampled signals. The sampling clock rate of the multiplexer and demultiplexer is above one megahertz and is safely higher than is necessary to retain signal bandwidths. This technique of sharing a single logarithmic amplifier is known in the art and is disclosed, for example, in U.S. Pat. No. 3,588,363 of M. Herscher and T. Martin entitled "Word Recognition System for Voice Controller" as well as in the above-referenced publication of T. Martin.

It will be recalled that the spectral component signals on lines **50*a* are entered into the feature extraction circuitry 60 (FIG. 1**) which senses the presence of properties of the spectral component signals that correspond to preselected properties or "features" of input words. In the particular prior art system being described for illustration, this sensing of properties or "feature extraction" is achieved inpart by deriving quantities known as "slope" and "broad slope" characteristics. These quantities give indication as to the polarity and magnitude of the slope of the input envelope when taken over specified segments of frequency spectrum. The manner in which these quantities are obtained is described in the above-referenced publication and patent.

Figure 2B:
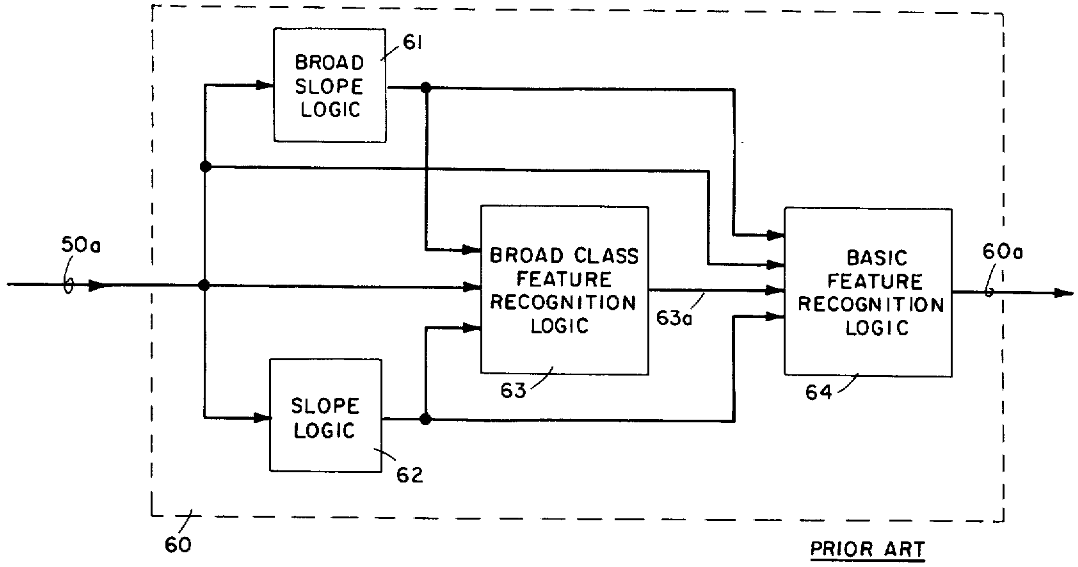
FIG. 2B is a block diagram of prior art feature extraction circuitry.

FIG. 2B shows a block diagram of the prior art feature extraction circuitry 60 which receives the spectral component signals on the lines **50*a*. The circuitry 60, which is also described in the referenced publication and patent, includes logic blocks 61 and 62 which derive sets of slope and broad slope quantities that are received by a "broad class feature" recognition logic block 63. The block 63 utilizes groups of operational amplifiers and appropriate peripheral circuitry to generate broad class feature signals 63a that indicate the presence of certain broadly classified phonetic characteristics in the input words. Examples of the broad classifications are "vowel/vowel like," "voicing only," "burst," "voiced noise-like consonant" etc. The signals 63*a* as well as the spectral component signals, slope, and broad slope signals are received by a "basic feature" recognition logic block 64. This block, which includes components that are similar in nature to the block 63, functions to generate the feature signals that indicate the presence of specific phonetic features (e.g. /I/, /s/, /θ/, /ʃ/) of the input spoken words. Generally, the hierarchical structure will include an intermediate logic block that derives "common group features" (e.g. "front vowel," "back vowel," "fricative," "stop consonant," etc.) or, alternatively, such common group features may be the most specific features derived for further processing by the sequential decision logic (FIG. 1). It will become clear that the present invention is applicable to the processing of various kinds of feature signals. Narrowly defined phonetic feature signals facilitate explanation of subsequent circuirty and the feature signals 60*a*** will therefore be assumed to be of this form. It should be emphasized, however, that the invention to be described is not limited to any particular form of feature signal generation.

Figure 2D:
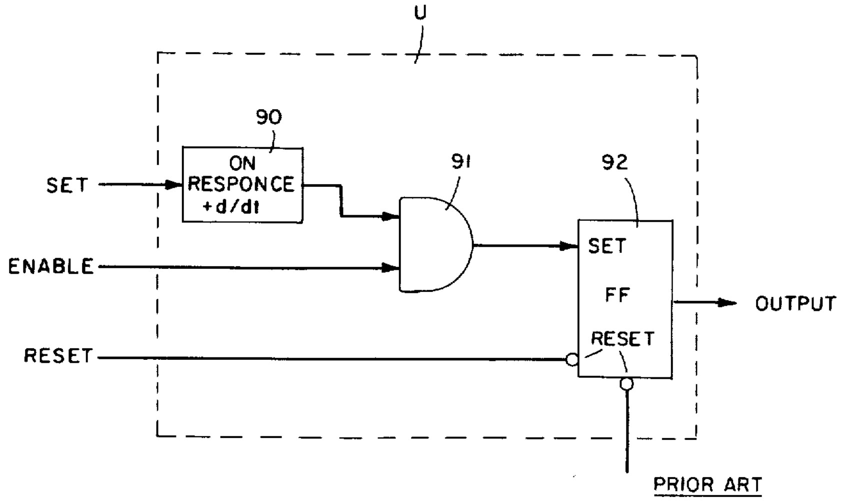
FIG. 2D is a simplified diagram of a basic prior art logic stage.
Figure 2C:
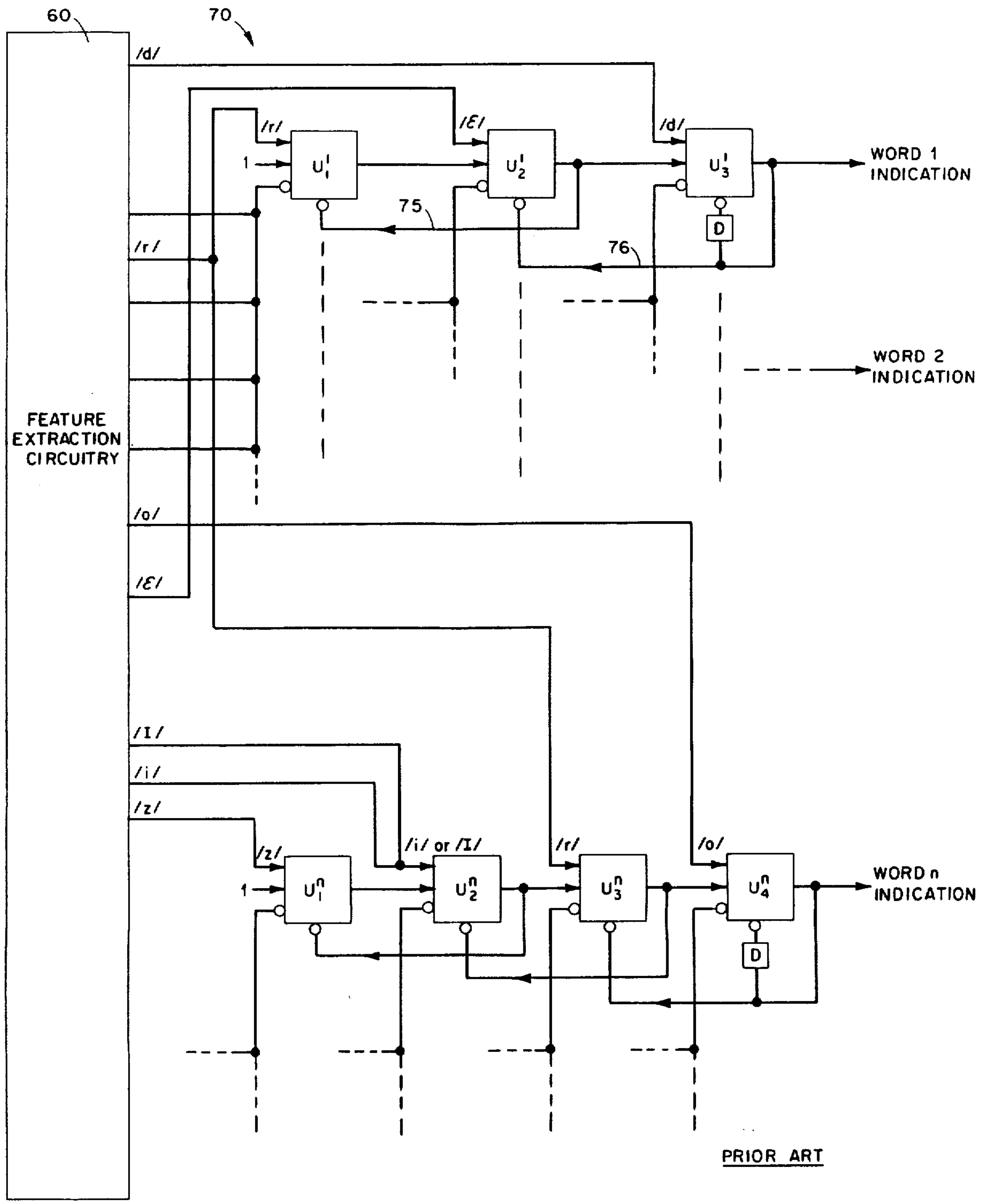
FIG. 2C is a block diagram of prior art sequential decision logic circuitry.

FIG. 2C is a block diagram of part of the prior art sequential decision logic circuitry 70 which receives the feature signals on the lines 60*a*. Again, reference is made to the above-described publication for a detailed description, the present diagram sufficing to show typical prior art operation. Individual words are "built into" the apparatus vocabulary by providing an independent logic chain for each word. In FIG. 2C, two of the logic chains, labeled "logic chain 1" and "logic chain *n*" are respectively shown as being configured to recognize the word "red" as word 1 and the word "zero" as word *n*. Logic chain 1 includes three logic stages designated $U_1^1$, $U_2^1$, and $U_3^1$, where the superscripts represent the word number and the subscripts represent the stage number within the sequence.

The basic logic stage is shown in the simplifed diagram of FIG. 2D and is seen to include a differentiator 90, an AND gate 91 and a flip-flop 92. The basic stage U has inputs designated "set" "enable" and "reset" inputs, and a single output. The reset input is directly coupled to the flip-flop reset terminal. A second reset input may also be provided, as shown. The enable input, which is typically received from a previous stage, is one input to the AND gate 91. The set input is received by the differentiator 90 which supplies the remaining input to AND gate 91 at the onset of a signal at the set input terminal. The output of AND gate 91 is coupled to the set terminal of flip-flop 92. In operation, the enable input must be present at the time of the set onset in order for the stage U to produce a high (logical "1") output. The stage U will then remain at a high output until one of the reset inputs resets flip-flop 92.

Considering word 1 as a first simplified example, the word red can be expressed by the phonetic sequence $/r/ \rightarrow /\epsilon/ \rightarrow /d/$. Accordingly, the top inputs of the three logic stages are coupled to the feature signals on the particular feature output lines that represent the phonemes /*r*/, /ε/ and /*d*/, respectively. When signals appear on these feature lines in the specified sequence, a logical 1 travels through the logic chain as follows: The enable input of $U_1^1$ is coupled to a logic 1 level, so when an /*r*/ feature signal occurs the stage $U_1^1$ is set to a 1 state (i.e., has a logical 1 output). When, subsequently, the /ε/ feature signal occurs, both the set and enable inputs of $U_2^1$ are 1, so $U_2^1$ goes to a 1 state. The output of $U_2^1$ is fed back to a reset input of $U_1^1$ so that, at this point in time, $U_1^1$ is reset to 0 and only $U_2^1$ is at a 1 state. If and when the /*d*/ feature signal next occurs, the stage $U_3^1$ goes to a 1 state, $U_2^1$ is reset via line 76, and an indicating means (not shown) is triggered to indicate that the spoken word red, has been received at the apparatus input. The last stage typically resets itself via a short delay, D.

In addition to certain of the feature signals being coupled to the set inputs of the logic stages, one or more different feature signals are typically coupled to the reset inputs of the stages, as is represented by the dashed lines leading to each reset input. These reset features, which can be determined experimentally before the system is wired, are useful in preventing extraneous word indications. The occurrence of a reset feature for a stage that is presently at a 1 level clears the 1 from the stage so that the logic chain must effectively "start over" in looking for the word. For example, the word "rented" includes the phonetic sequence $/r/ \rightarrow /\epsilon/ \ldots \rightarrow /d/$ with additional phonemes including /*n*/ in the dotted space. Thus, by providing the reset input of stage $U_2^1$ with the feature signal /*n*/, the stage will be reset (for the spoken word "rented") before the /*d*/ at the end of the word causes an incorrect indication that the word red had been spoken. Numerous usages of reset signals in this manner are possible.

In addition to the usage of feature signals as set and reset signals, it is known that timing constraints can be judiciously utilized in the sequential logic circuitry. For example, a timed self-reset can be built into the individual stages so that if the next expected set feature does not occur within a fraction of a second the stage will clear itself. Also, a stage can be designed to require that an input feature last a specified minimum time.

Considering the example of word n (FIG. 2C), the particular word zero can be expressed by the phonetic sequence $/z/ \rightarrow (/I/ \text{ or } /i/) \rightarrow /r/ \rightarrow /o/$, where the alternative phonemes in the second position correspond to the pronunciations that rhyme with "feet" and "fit," respectively. The logic chain n has four stages designated $U_1^n$ through $U_4^n$, each stage having the appropriate feature line or lines coupled to its set input. Reset feature line input connections are not shown. Operation is similar to that for word 1, the main difference being that two feature lines (corresponding to the features /I/ and /*i*/) are coupled to the set input of stage $U_2^n$. In this manner, either of these features occurring at the appropriate chronological point can set this logic stage, so the apparatus will recognize either of the alternative pronunciations of the word zero. In practical designs, usable by multiple speakers, the number of alternate set features needed for typical vocabulary words can be substantial, the single instance shown being for purposes of illustration. As above-stated, when the equipment's recognition criteria is made less restrictive, it follows that the criteria can be more easily satisfied by extraneous words or sounds and recognition accuracy suffers.

Figure 3:
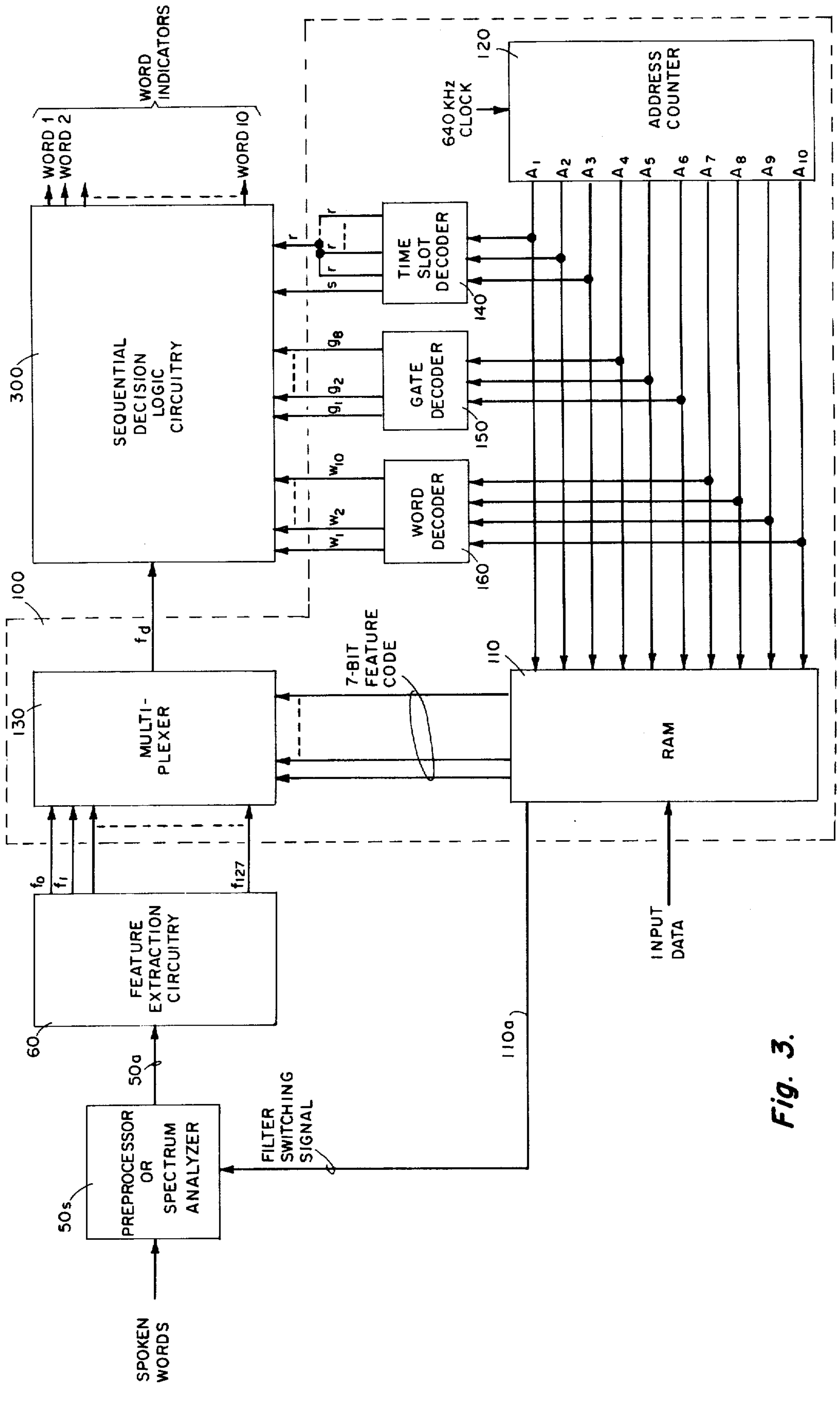
FIG. 3 is a block diagram of an embodiment of the invention.

FIG. 3 is a block diagram of an embodiment of the invention that is programmable to recognize selected words as spoken by a particular individual. Spoken words are received by a preprocessor or spectrum analyzer 50*s* that performs a function similar to the preprocessor 50 of FIGS. 1 and 2. Processed spectral component signals 50*a* are received by feature extraction circuitry 60 which may typically comprise a unit of the type described in conjunction with FIG. 2B. In the present embodiment, it is assumed that there are 128 features designated $f_0$ through $f_{127}$ extracted by the circuitry 60. The features on the 128 lines are digitally indicated as being "present" by a logical 1 or "not present" by a logical 0. The available features may be of the form of phonemes, "basic features," "broad class features," "slope features" or the like.

The feature signals $f_0$ through $f_{127}$ are selectively coupled, via programmable means 100 (shown in dashed enclosure) to sequential decision logic circuitry 300. The circuitry 300 includes a number of sequential logic chains, each logic chain representing an individual vocabulary word. In the present embodiment, the equipment has a ten word vocabulary and, accordingly, circuitry 300 includes ten logic chains. Each logic chain is provided with a plurality of logic stages that may be of the type shown in FIG. 2D. The logic stages in each chain are arranged in a series arrangement as in FIG.

2C but, unlike FIG. 2C, particular feature signals are not wired to the logic stage inputs.

Before treating the manner in which the feature signals are selectively coupled to the logic stages in circuitry 300, it is helpful to briefly describe a typical overall operating procedure for the apparatus of FIG. 3. An individual speaker, who is to later use the apparatus, preliminarily speaks chosen vocabulary words, and the sequence of features associated with each word are observed and graphically recorded. This may be done, for example, by temporarily coupling the outputs of feature extraction circuitry 60 to signal recorders, or, by using a separate feature extractor/recorder setup that is especially suited for this purpose. The recorded sequence of feature signals gives indication as to how the sequential decision logic should be configured so as to give optimum recognition accuracy for the particular word as spoken by the individual in question. As a simplified example, preliminary speech samples may indicate that a particular individual pronounces the word zero as /z/ → /I/ → /r/ → /o/, and never uses the alternate pronunciation /z/ → /i/ → /r/ → /o/. Also, such samples may indicate the consistent presence or absence of features at particular chronological points in the sequence. Using such information, and a knowledge gained from general experience, an operator can formulate a sequence of feature set and reset events that best define the manner in which the individual in question speaks the particular word. This procedure is of the same type that could be used in determining the "wiring layout" for the sequential logic of FIG. 2C but, as demonstrated, the sequence can be more selective when customized for a particular individual.

Referring again to FIG. 3, the operational phase of the invention is initiated by taking the data representative of particular vocabulary words spoken by a particular individual, and entering it in a random access memory (RAM) 110 that comprises a part of the programmable means 100. The programmable means 100 then establishes, in a manner to be described, the appropriate effective "connections" between feature signals and the sequential logic stages in the unit 300.

Figure 4:
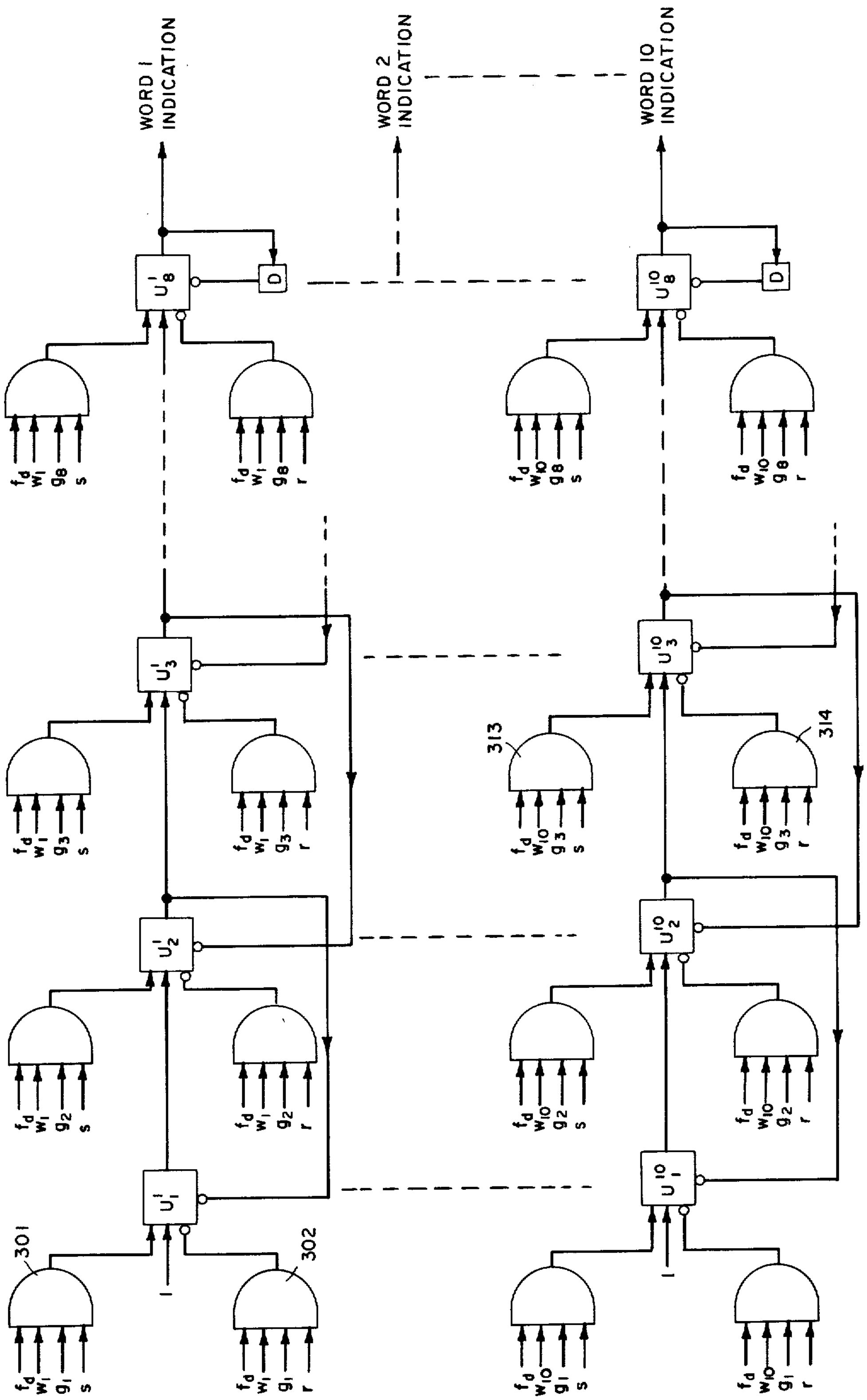
FIG. 4 is a block diagram of the sequential decision logic circuitry of the embodiment of FIG. 3.

A block diagram of the sequential logic circuitry 300 is shown in FIG. 4. The illustrated embodiment has a ten word vocabulary and, accordingly, ten logic chains, the first and last of which are shown in part. Each logic chain in this embodiment has eight stages, but as will become clear, not all of the stages in a given chain need be "utilized" for a particular word. The stage superscript/subscript notation of FIG. 2C is maintained, and each stage U again has set, enable, and reset inputs. Each stage of the sequential logic circuitry 300 is "activated" for a period of about 12.5 microseconds, this "activatiion" taking place once every millisecond. The terms activated and activation mean that the stage is capable of being set or reset during this time. In this manner, as will become understood, every stage is activated at a high enough frequency such that, for practical purposes, it effectively functions on a continous basis. In other words, by coupling the appropriate feature signals to the appropriate inputs of a stage during its active time, the stage operates as though the feature signals were permanently coupled to it. This can be accomplished since the feature signals are binary (present or absent) and since their rate of change of state is slow enough that they can be sampled at a given rate (once per millisecond in this embodiment) without loss of information.

The set input in stage $U_1^1$ is the output of an AND gate 301 which receives as inputs four signals designated $f_d$, $w_1$, $g_1$, and $s$. The input $f_d$ is a selected feature signal (the derivation of which will be described hereinafter), and the remaining inputs are utilized to address the particular stage during specified "time slots". The input $w$ is indicative of the word being addressed, $w_1$ being present (i.e., a logical 1) only when word 1 is being addressed. The input $g$ is indicative of the stage gates being addressed, $g_1$ being a 1 only when the gates of the first stage (of any word) are being addressed. The input $s$ indicates that a set gate (e.g. gate 301) is being addressed.

The enable input to stage $U_1^1$ is coupled to a logical 1 level as are the enable inputs to the first stages of all words. The enable inputs to all other stages receive the outputs of the previous stages as was explained in conjunction with FIG. 2C. The reset input to stage $U_1^1$ is the output of an AND gate 302 which receives four signals as inputs. Again, $f_d$ is a selected feature signal and the inputs $w_1$ and $g_1$ address the first stage of word 1. The input $r$ indicates that a reset gate is being addressed. The outputs of the second through the eighth stages are fed back to the other reset terminal of each previous stage.

Each of the eighty stages in the sequential logic circuitry has AND gates associated with its set and reset inputs. The inputs to these AND gates are designated by the same addressing notation set forth for gates 301 and 302. For example, stage $U_3^{10}$ has AND gates 313 and 314 which feed its set and reset inputs. Gate 313 has inputs designated $f_d$, $w_{10}$, $g_3$, and $s$ which indicate a set feature for the third stage of the tenth word. The inputs to gate 314 are the same as for gate 314 except that this gate is addressed only during reset time slots.

Referring again to FIG. 3, the addresses for the sequential decision logic circuitry 300 and for the RAM 110 are generated by an address counter 120 in the programmable means 100. In the present embodiment there are 640 distinct addresses that are generated in binary form on ten output lines $A_1$ through $A_{10}$ of counter 120. There are 640 distinct memory locations in RAM 110 that are sequentially addressed. In each memory location is stored a 7-bit binary word or "feature code" that represents one of the features $f_0$ through $f_{127}$. The feature code for each address is determined during the programming phase of operation. A multiplexer 130, which may be of conventional construction, decodes the 7-bit feature code and determines which feature is to be passed during the present time slot. In other words, the 7-bit feature code is a "selection signal" which selects the feature liine (from among 128 of them) that is passed as $f_d$ at a given instant.

Portions of the address on lines $A_1$ through $A_{10}$ are also received by three decoders 140, 150 and 160. The first three bits of the address define the present time slot and are decoded by a time slot decoder 140 which produces an output (a logical 1) on one of eight output lines. In the present embodiment eight time slots are associated with each sequential logic stage in circuitry 300. Of these, one time slot relates to a set feature and the other seven to reset features. The seven output lines that relate to reset features are coupled to a single common line that is, in turn, coupled to the $r$ inputs of all gates in the circuitry 300 (FIG. 3). The output line that relates to set features is coupled to the *s* inputs of all gates in the circuitry 300. Thus, for every eight counts by the address counter 120, one count produces a logical 1 on all *s* gate inputs and the next seven counts produce logical 1's on all *r* gate inputs. For example, the count "000" would yield an output on the *s* line and the counts "001" through "111" would yield an output on the *r* line.

The next three bits of the address count are received by a "gate decoder" 150 which produces an output on one of eight lines $g_1$ through $g_8$, each of which is coupled to the correspondingly labeled gate inputs in the circuitry 300. Thus, for example, the count 000 on lines $A_1$ $A_2$ $A_3$ would produce a logical 1 on line $g_1$, the count 001 would produce a logical 1 on line $g_2$, and so on. The gate count is, of course, stepped by one only after eight time slots since the time slot bits are less significant bits then the gate count bits.

The last four (most significant) bits of the address count are, for this embodiment, used to count only ten of the 16 possible binary combinations; e.g. from 0000 to 1001. These bits are received by the "word decoder" 160 that produces an output on one of 10 lines, $w_1$ through $w_{10}$, which are coupled to each of the correspondingly labeled gate inputs in circuitry 300.

The address counter, which is clocked at 640 KHz, is seen to generate a count of 640 (8×8×10) and then recycle. During this cycle, which takes 1 millisecond, every logic stage in circuitry 300 is activated eight times. For each such activation, a programmed feature $f_d$ is coupled to the appropriate gate of the stage being addressed. The following are examples of certain address counts and the corresponding stage gate inputs that are addressed to receive the $f_d$ passed during the counted time slot.

| | | |
|---|---|---|
| "000000000" | — | set input of $U_1^1$ |
| "000000001" | — | reset input of $U_1^1$ |
| "000000010" | — | reset input of $U_1^1$ |
| "000000011" | — | reset input of $U_1^1$ |
| "000001000" | — | set input of $U_2^1$ |
| "000001001" | — | reset input of $U_2^1$ |
| "000101011I" | — | reset input of $U_3^2$ |
| "100111000" | — | set input of $U_8^{10}$ |
| "100111001" | — | reset input of $U_8^{10}$ |
| "100111111" | — | reset input of $U_8^{10}$ |

Figure 5:
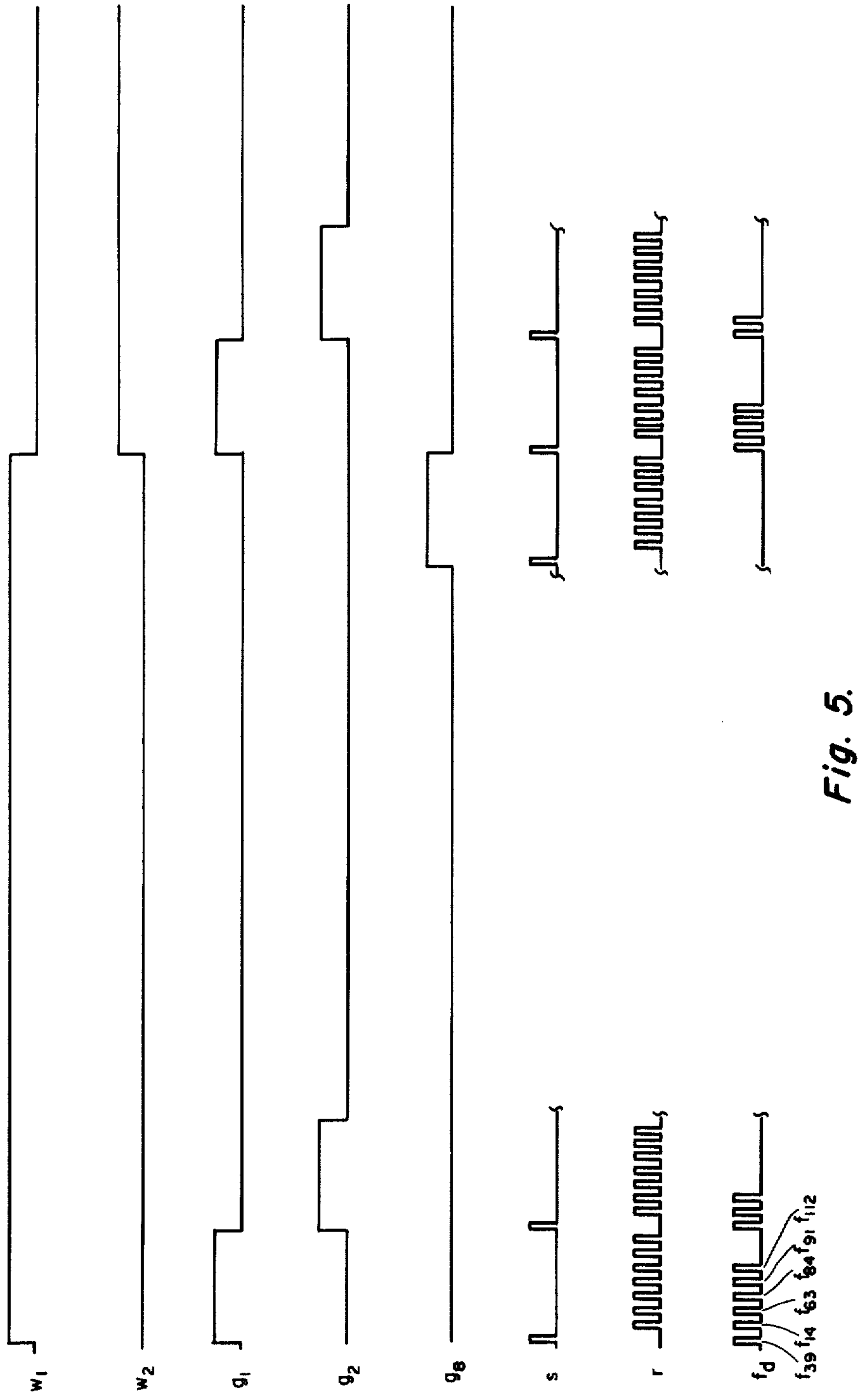
FIG. 5 illustrates the timing associated with the circuitry of FIGS. 3 and 4.

The timing associated with the circuitry of FIGS. 3 and 4 is illustrated with the aid of FIG. 5 which shows representative timing sequences for $w_1$, $w_2$, $g_1$, $g_2$, $g_8$, *s*, *r*, and for an example of features $f_d$ that are coupled to particular inputs. The individual time slots for *s* and *r* have a duration of about 1.56 microseconds as follows from the 640 KHz clock rate. For the example of FIG. 5, the first stage of word 1, $U_1^1$ (FIG. 4), is assumed to have been programmed for one set feature and five reset features. This accounts for $f_d$ being shown as present for a total of 6 time slots. Assume, further, that the set feature programmed for $U_1^1$ is $f_{39}$ and that the reset features programmed for $U_1^1$ are $f_{14}$, $f_{63}$, $f_{84}$, $f_{91}$ and $f_{112}$. In such case, $f_{39}$ would be passed as $f_d$ during the first time slot and would be effectively coupled to the set terminal of $U_1^1$ during this time slot via gate 301 since all other inputs to gate 301 are 1 during this time slot. One millisecond later (i.e., after a full 640 time slot counting cycle), the feature $f_{39}$ will again be coupled to the set terminal of $U_1^1$. For reasons given above, this is tantamount to $f_{39}$ being continuously coupled to the set terminal of $U_1^1$. (Note that the $f_d$ pulses shown in FIG. 5 represent the coupling of a feature during the particular time slot and not the actual presence of the feature which may or may not be present in the received spoken word at a particular time.) Thus, if $f_{39}$ is contained in a spoken word (FIG. 3), the stage $U_1^1$ will be set. In a similar manner the reset features are effectively coupled on a continuous basis to the reset input of $U_1^1$ by virtue of their being coupled as $f_d$ to gate 302 during time slots (2 through 6) that occur while all other inputs to gate 302 are 1. Thus, if any of the five specified features occur while $U_1^1$ is set, the stage will be reset. The programming for the time slots of this example would be:

| Address | Feature Code | |
|---|---|---|
| "000000000" | "0100101" | ($f_{39}$) |
| "000000001" | "0001110" | ($f_{14}$) |
| "000000010" | "0111111" | ($f_{63}$) |
| "000000011" | "1001100" | ($f_{84}$) |
| "000000100" | "1011011" | ($f_{91}$) |
| "000000101" | "1110000" | ($f_{112}$) |

The example of FIG. 5 shows one set feature and two reset features for the second stage of word 1, $U_2^1$. This accounts for $f_d$ being present during the first three time slots of $g_2$.

The example of FIG. 5 further shows no set or reset features for the eighth stage of word 1. In many cases, such as this example, less than the entire eight stages are needed to represent the phonetic sequence of events that represent a word. When the last stage or stages of a particular logic chain are not to be utilized they can be eliminated from active operation by effectively "tying" their set inputs to a logical 1. This can be easily accomplished by maintaining one of the feature output lines, e.g. $f_{127}$ (code 1111111) at a logical 1 level, and then setting up the program such that any set address (i.e., any address whose last 3 bits are 000) that is not assigned a specific feature code is automatically given the code 1111111. Any stage to which this applies will be set as soon as the stage before it provides an enable signal. Thus, for example, if only five stages of a particular chain are needed to represent a certain word, the last three stages will receive 1's during their set time slots. If and when the fifth stage is set, the sixth, seventh and eighth stages will immediately set in sequence giving a word indication signal.

A similar technique can be employed to handle available reset inputs that are not being utilized. These can be effectively tied to a logical 0 by providing one of the feature output signals (e.g. $f_0$ or code 0000000) at a logical 0 level and then programming any reset addresses that are not specified to have the feature code 0000000. By so doing, none of the excluded reset time slots can result in a stage reset.

The foregoing description has set forth a particular embodiment that is programmable to provide one set feature and seven reset features to sequential logic circuitry. It should be understood, however, than many variations can be made within the spirit of the invention. For example, provision could be made for two or more alternate set features per gate by merely having two or more lines of the time slot decoder 140 (FIG. 3) coupled to the *s* input terminals in the sequential logic. Another option would be to utilize some of the logic stages and/or time slots to impose minimum or maximum time duration requirements on the sampled feature output signals.

The input data can be programmed to include an indication as to whether the subsequent user will be male or female. In this instance, a switching signal 110*a* (FIG. 3) is utilized to activate one of two parallel filter banks in the preprocessing spectrum analyzer 50S. The two parallel banks would take the place of the single filter bank 53 of FIG. 2A. Each of the banks can have their filters distributed in an optimum manner over the range of frequencies expected for male or female speakers, these ranges varying substantially for typical male vs. female speakers.

We claim:

1. Apparatus which receives input data representative of speech feature sequences expected to occur characteristically during selected words, and which is programmable thereby to recognize these words when they are subsequently received in spoken form, comprising:

a. feature generating means for processing received spoken words and generating feature output signals on particular ones of a number of feature output lines, the particular ones being dependent upon the features present in a given spoken word;

b. at least one sequential logic chain which includes a plurality of logic units, each logic unit having a logic input line, and each logic unit being activated according to its relative position within the sequential logic chain by the occurrence in sequence of feature output signals on the logic input lines;

c. means for storing the input data for each selected word; and d. program operable means responsive to the input data stored in said storing means for effectively coupling selected ones of said feature output lines to said logic input lines, the coupling selections being variable and in accordance with the stored input data, such that said sequential logic chain is activated by the particular sequence of feature output signals corresponding to a given selected word.

2. Apparatus as defined by claim 1 wherein said program operable means includes means for periodically sampling the signals on said selected feature output lines and means for applying the sampled signals to said logic input lines, the feature output line whose signal is sampled at a given time being determined by the stored input data.

3. Apparatus as defined by claim 2 wherein the sampled signals are applied to logic input lines in a predetermined sequence, the sequence being repeated continuously.

4. Apparatus as defined by claim 3 wherein the time for a single sequence through all logic input lines is of the order of 1 millisecond.

5. Apparatus as defined by claim 1 wherein said program operable means comprises:

an address generator for continuously generating a series of addresses in repetitive fashion;

means responsive to addresses generated by said address generator for controlling the sequential enabling of the logic input lines of said sequential logic chain;

a multiplexer coupled to said feature output lines and operative to couple the signal on a selected one of said feature output lines to each of said logic input lines;

and wherein said storing means is responsive to addresses from said address generator to produce selection signals that are coupled to said multiplexer and control the selection of a feature output line by said multiplexer.

6. Apparatus as defined by claim 5 wherein said feature generating means includes spectrum analyzing means for translating received spoken words into a plurality of spectral component signals.

7. Apparatus as defined by claim 6 wherein said spectrum analyzing means includes two sets of filter banks in parallel, and means for activating one of said filter banks under control of said storing means.

8. Apparatus which receives input data representative of speech feature sequences expected to occur characteristically during selected words as spoken by an individual, and which is programmable thereby to recognize these words when they are subsequently received in spoken form, comprising:

a. feature generating means for processing received spoken words and generating feature output signals on particular ones of a number of feature output lines, the particular ones being dependent upon the features present in a given spoken word;

b. sequential logic circuitry including sequential logic chains, each of which comprises a plurality of logic units each logic unit having a logic input line and a reset line, and each logic unit being activated according to its relative position within its associated sequential logic chain by the occurrence in sequence of feature output signals on the logic input lines or inactivated by the occurrence of signals on the reset lines;

c. means for storing the input data for each selected word; and d. program operable means responsive to the input data stored in said storing means for effectively coupling selected ones of said feature output lines to said logic input lines, the coupling selections being variable and in accordance with the stored input data, such that each said sequential logic chain is activated by the particular sequence of feature output signals corresponding to a given selected word.

9. Apparatus as defined by claim 8 wherein said program operable means includes means for periodically sampling the signals on said selected feature output lines and means for applying the sampled signals to said logic input lines, the feature output line whose signal is sampled at a given time being determined by the stored input data.

10. Apparatus as defined by claim 9 wherein the sampled signals are applied to logic input lines in a predetermined sequence, the sequence being repeated continuously.

11. Apparatus as defined by claim 8 wherein said program operable means comprises:

an address generator for continuously generating a series of addresses in repetitive fashion;

means responsive to addresses generated by said address generator for controlling the sequential enabling of the logic input lines of said sequential logic chain;

a multiplexer coupled to said feature output lines and operative to couple the signal on a selected one of said feature output lines to each of said logic input lines;

and wherein said storing means is responsive to addresses from said address generator to produce selection signals that are coupled to said multiplexer and control the selection of a feature output line by said multiplexer.

* * * * *